United States Patent
Oyanagi et al.

(10) Patent No.: US 7,790,245 B2
(45) Date of Patent: *Sep. 7, 2010

(54) PHOTO CURABLE INK COMPOSITION SET, AND RECORDING METHOD AND RECORDINGS EMPLOYING INK COMPOSITION SET

(75) Inventors: Takashi Oyanagi, Suwa (JP); Keitaro Nakano, Suwa (JP); Kazushige Inoue, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 368 days.

This patent is subject to a terminal disclaimer.

(21) Appl. No.: 11/975,704

(22) Filed: Oct. 19, 2007

(65) Prior Publication Data

US 2008/0096998 A1    Apr. 24, 2008

(30) Foreign Application Priority Data

| Oct. 19, 2006 | (JP) | ............................. 2006-285096 |
| Oct. 19, 2006 | (JP) | ............................. 2006-285102 |
| Jan. 15, 2007 | (JP) | ............................. 2007-006196 |
| Jan. 15, 2007 | (JP) | ............................. 2007-006197 |
| Jul. 18, 2007 | (JP) | ............................. 2007-187537 |
| Jul. 31, 2007 | (JP) | ............................. 2007-198887 |

(51) Int. Cl.
*C09D 11/02* (2006.01)

(52) U.S. Cl. .......................... 427/511; 522/71; 522/75; 522/96; 522/173; 522/16; 522/181; 522/182; 522/183

(58) Field of Classification Search .................. 522/75, 522/83, 26, 181, 71, 16, 173, 182, 183, 96; 427/466, 511

See application file for complete search history.

(56) References Cited

U.S. PATENT DOCUMENTS

| 4,133,793 | A | * | 1/1979 | Lewis et al. | ................. 524/560 |
| 4,507,466 | A | | 3/1985 | Tomalia et al. | |
| 4,558,120 | A | | 12/1985 | Tomalia et al. | |
| 4,568,737 | A | | 2/1986 | Tomalia et al. | |
| 4,587,329 | A | | 5/1986 | Tomalia et al. | |
| 4,631,337 | A | | 12/1986 | Tomalia et al. | |
| 4,694,064 | A | | 9/1987 | Tomalia et al. | |
| 5,041,516 | A | | 8/1991 | Frechet et al. | |
| 5,623,001 | A | | 4/1997 | Figov | |
| 6,187,897 | B1 | * | 2/2001 | Kawashima et al. | ........ 528/310 |
| 6,300,388 | B1 | * | 10/2001 | Verdonck et al. | ............ 522/173 |
| 6,518,370 | B2 | * | 2/2003 | Abuelyaman et al. | ....... 525/437 |
| 2005/0159501 | A1 | * | 7/2005 | Kiefer-Liptak | ................ 522/71 |
| 2007/0129457 | A1 | * | 6/2007 | Nakano et al. | .................. 522/1 |
| 2007/0249750 | A1 | * | 10/2007 | Oyanagi et al. | ................ 522/84 |
| 2008/0081119 | A1 | * | 4/2008 | Oyanagi et al. | .......... 427/385.5 |

FOREIGN PATENT DOCUMENTS

| EP | 1 614 730 | 1/2000 |
| EP | 1 260 563 | 11/2002 |
| EP | 1 452 569 | 9/2004 |
| EP | 1 614 730 | 11/2006 |
| EP | 1 815 978 | 8/2007 |
| JP | 03-216379 | 9/1991 |
| JP | 05-186725 | 7/1993 |
| JP | 08-218018 | 8/1996 |
| JP | 2004-018716 | 1/2004 |
| JP | 2005-298757 | 10/2005 |
| WO | 00/52530 | 9/2000 |
| WO | 2004/104051 | 12/2004 |
| WO | 2005/089957 | 9/2005 |
| WO | 2005/095006 | 10/2005 |
| WO | 2006/098676 | 9/2006 |
| WO | 2007/026366 | 3/2007 |

OTHER PUBLICATIONS

Database WPI Week 200579 Derwent Publications, Ltd. London, GB; AN 2005-778816 XP002473261.
Hawker, C.J. et al. "Hyperbranched Poly(ethylene glycol)s: A New Class of Ion-Conducting Materials" *Macromolecules* 29 (1996), pp. 3831-3838.
Hawker, C.J. et al. "Preparation of Polymers with Controlled Molecular Architecture. A New Convergent Approach to Dendritic Macromolecules" *J. Am. Chem. Soc.* 112 (1990), pp. 7638-7647.
Kim, Y.H "Highly branched Aromatic Polymers Prepared by Single Step Synthesis"*Macromol. Symp.* 77 (1994), pp. 21-33.
Patent Abstracts of Japan of JP 03-216379 dated Sep. 24, 1991.
Patent Abstracts of Japan of JP 05-186725 dated Jul. 27, 1993.
Patent Abstracts of Japan of JP 08-218018 dated Aug. 27, 1996.
Patent Abstracts of Japan of JP 2004-018716 dated Jan. 22, 2004.
Patent Abstracts of Japan of JP 2005-298757 dated Oct. 27, 2005.

* cited by examiner

*Primary Examiner*—Susan W Berman
(74) *Attorney, Agent, or Firm*—Ladas and Parry LLP

(57) ABSTRACT

A photo curable ink composition set, comprising: an ink composition A that includes at least a color material, a polymerizable compound, and a radical polymerization photoinitiator; and an ink composition B that includes at least a radical polymerizable compound and does not include the color material and the radical polymerization photoinitiator, wherein the ink composition A and/or B includes a sensitizer.

19 Claims, No Drawings

PHOTO CURABLE INK COMPOSITION SET, AND RECORDING METHOD AND RECORDINGS EMPLOYING INK COMPOSITION SET

The entire disclosure of Japanese Patent Application Nos. 2006-285102 and 2006-285096 filed on Oct. 19, 2006; 2007-198887 filed on Jul. 31, 2007; 2007-006197 and 2007-006196 filed on Jan. 15, 2007; 2007-187537 filed on Jul. 18, 2007; are expressly incorporated by reference herein.

BACKGROUND

1. Technical Field

The present invention relates to a two-constituent photo curable ink composition set that is mixed and then photoset by irradiation with light, and to a recording method and records employing the ink composition set.

2. Related Art

Inkjet recording is a printing method in which printing is brought about when droplets of an ink composition are propelled so as to adhere to a recording medium such as paper. A characteristic of inkjet recording is that images of high resolution and high quality can be rapidly printed.

Ink compositions used in inkjet recording are generally based on aqueous solvents, which contain color materials and wetting agents such as glycerin to prevent clogging.

On the other hand, when printing is done on recording media such as various types of paper and fabric that are not readily penetrated by ink compositions, or metal, plastic, or other materials that are not penetrated at all, such as sheets and films made from phenol, melamine, vinyl chloride, acrylic, polycarbonate, or other resins, the ink composition must include a component that allows the color material to be affixed to the recording medium in a stable manner.

Meanwhile, "inkjet recording media including at least a colorant and a component that is polymerized upon the provision of UV rays" have been proposed in the related art (see, for example, JP-A-3-216379). This inkjet ink recording medium is said to ensure high quality printing with better images on ordinary paper without compromising the many advantages of inkjet printing.

"Photo curable types of inkjet inks comprising color materials, photo curable agents (radical polymerizable compounds), (radical photo) polymerization initiators, and the like" have also been proposed (see, for example, U.S. Pat. No. 5,623,001). This ink is said to avoid the problem of the ink bleeding into the paper, allowing better quality to be achieved.

On the other hand, "an ink for an inkjet printer having the characteristic of being set by the irradiation of UV rays, wherein the ink for the inkjet printer comprises at least water, a water-soluble photo curable type of resin prepolymer with at least 2 functional groups in the monomer structure, a water-soluble or water-insoluble photoinitiator, and a water-soluble dye" has been proposed (see, for example, JP-A-5-186725). This ink is said to allow the following inks "1 through 6" to be provided.

1. It is possible to provide an ink that includes a dye as the color material in an aqueous system for coloring printing, yet has the effect of preventing the dye from bleeding even if moisture (ink in printing of second color or later) is again deposited after printing.

2. It is possible to provide an ink that does not readily dry out in head nozzles, even without the addition of agents to prevent drying, by using a UV-setting type of resin prepolymer.

3. It is possible to provide a printing mechanism in which, when using ink that contains a photo curable resin, the resin component and reaction initiator are stored separately to enhance the ink storage stability, and are sprayed from separate head nozzles to form print dots.

4. It is possible to provide an ink making use of a resin to which dye molecules are readily adsorbed so that, in inks that contain a photo curable resin, the resin component and dye component will not separate when the resin component is set.

5. It is possible to provide an ink that includes a photo curable resin, wherein the color material dye will not fade during UV irradiation.

6. It is possible to provide an ink capable of preventing pigment from drying out and aggregating in head nozzles, particularly when organic pigments are used as the color material in common aqueous-based inks for inkjet printers.

"A separable inkjet recording ink which is composed of an ink (A) including a monomer that becomes set upon the provision of energy and a solvent for dissolving the monomer, and an ink (B) including at least one pigment dispersion as a color material component and a solvent for the dispersion thereof" has also been proposed (see, for example, JP-A-8-218018). This ink is said to provide an inkjet recording ink that in itself has good storage stability and permits recording with good photo-resistance, heat-resistance, or print quality.

"A UV-setting ink including a photopolymerizable monomer, adhesive, UV sensitizer, and 20 to 40 wt % volatile organic solvent" has also been proposed (see, for example, JP-A-2004-18716). This UV-setting ink composition includes a volatile organic solvent, and the UV sensitizer substantially acts as a photoinitiator.

"A UV-setting white ink composition for inkjet recording, which includes a UV-curable compound, low-boiling solvent, photoinitiator, and sensitizer" has also been proposed (see, for example, JP-A-2005-298757). The low-boiling solvent is an essential constituent of this white ink composition, and the sensitizer is an amine that substantially acts as a polymerization promoter, which is added to minimize the inhibition of polymerization by oxygen during the radical polymerization. The inclusion of the volatile organic solvent is an advantage in that the viscosity of the ink composition can be lowered, but is also undesirable because of need for a drying treatment, as well as heat energy and the extra burden in terms of equipment, since the failure to remove the solvent prior to the setting reaction will result in printing defects caused by bubbles in the organic solvent, lower adhesion on the recording medium, and problems caused by the volatilization of the solvent over the long term. Since, furthermore, the release of organic solvents into the atmosphere is also environmentally undesirable, another major drawback is the need to set up recovery equipment or exhaust gas combustion equipment, making it impossible to consider this a very desirable option.

Other problems, in addition to the above, which occur during the use of the above ink compositions proposed in the past are that the sensitivity and photo curing rate are inadequate, and that the polymerizable compounds and polymerization initiators included in the ink compositions accelerating the curing reaction of the ink during storage.

In addition, when semiconductor elements, LED, LD, or the like are used as UV sources for the photo curing reaction, these elements ensure the efficient radiation of violet/blue visible light or longer wavelengths (350 nm to 400 nm) in the ultraviolet region with relatively low energy consumption, but a problem is that photoinitiators that produce radicals at these wavelengths tend to cause the set film to become yellow.

On the other hand, low-yellowing radical polymerization photoinitiators which do not cause set films to become yellow can efficiently produce radicals under UV rays with an absorption wavelength of 350 nm or less.

However, low pressure mercury lamps, high pressure mercury lamps, ultrahigh pressure mercury lamps, halogen lamps, xenon lamps, and the like are used to obtain light in this wavelength region, and a number of problems resulting from their use must be addressed, such as thermal damage to the recording media, and the need for larger-scale equipment, high power consumption, and incidental equipment (refrigeration, ventilation, shielding).

SUMMARY

An advantage of some aspects of the invention is that the above problems are overcome through the provision of a two-constituent photo curable ink composition set that has better photo curing sensitivity and storage stability, and that also allows low-yellowing radical polymerization photoinitiators to react more efficiently.

As a result of extensive research, the inventors perfected the present invention upon discovering that the above objects may be achieved by employing the following structure.

Specifically, the present invention provides:

(1) a photo curable ink composition set, including an ink composition A that includes at least a color material, a polymerizable compound, and a radical polymerization photoinitiator, and an ink composition B that includes at least a radical polymerizable compound and does not include the color material or the radical polymerization photoinitiator, wherein the ink composition A and/or B includes a sensitizer;

(2) the photo curable ink composition set according to (1) above, including, as the radical polymerizable compound included in the ink composition B, at least a radical polymerizable compound that is copolymerized with the polymerizable compound included in the ink composition A in the presence of radicals when the ink composition A and ink composition B are mixed;

(3) the photo curable ink composition set according to (1) or (2) above, wherein the sensitizer is one or a mixture of two or more thioxanthone compounds or coumarin compounds;

(4) the photo curable ink composition set according to any of (1) through (3) above, including at least an allyl compound as the polymerizable compound included in the ink composition A;

(5) the photo curable ink composition set according to (4) above, wherein the allyl compound is an allyl ether compound;

(6) the photo curable ink composition set according to (5) above, wherein the allyl ether compound is allyl glycol;

(7) the photo curable ink composition set according to any one of (2) through (6) above, wherein the radical polymerizable compound that is included in the ink composition B and is copolymerized with the polymerizable compound included in the ink composition A in the presence of radicals when the ink composition A and ink composition B are mixed is a dendritic polymer;

(8) the photo curable ink composition set according to (7) above, wherein the dendritic polymer is a hyperbranched polymer and/or dendrimer;

(9) a recording method employing the photo curable ink composition according to any one of (1) through (8) above;

(10) a recording obtained by the recording method according to (9) above;

(11) a photo curable ink composition set, including an ink composition A that includes a radical polymerization photoinitiator and a polymerizable compound, and an ink composition B that includes a color material and a polymerizable compound, wherein the ink composition A and/or ink composition B includes a sensitizer, and the ink composition A and ink composition B are mixed and then photoset by irradiation with light;

(12) the photo curable ink composition set according to (11) above, wherein the sensitizer is a thioxanthone compound or coumarin compound;

(13) the photo curable ink composition set according to (11) or (12) above, wherein the ink composition A and the ink composition B are both composed of nonvolatile components;

(14) the photo curable ink composition set according to any of (11) through (13) above, wherein the concentration of the sensitizer is 0.01 wt % to 1.0 wt % in the ink composition A and/or ink composition B;

(15) the photo curable ink composition set according to any of (11) through (14) above, wherein the ink composition A and ink composition B include an ethylene glycol monoallyl ether and/or N-vinyl compound as the polymerizable compound;

(16) the photo curable ink composition set according to (15) above, wherein the N-vinyl compound is N-vinyl formamide;

(17) the photo curable ink composition set according to any of (11) through (16) above, wherein the ink composition A and ink composition B include at least one dendritic polymer as the polymerizable compound;

(18) the photo curable ink composition set according to (17) above, wherein the dendritic polymer is a hyperbranched polymer and/or dendrimer;

(19) a recording method in which an ink composition A including a radical polymerization photoinitiator and a polymerizable compound and an ink composition B including a color material and a polymerizable compound are mixed and then discharged onto a recording medium to be photoset by irradiation with light, wherein the ink composition A and/or ink composition B includes a sensitizer; and

(20) a recording method in which an ink composition A including a radical polymerization photoinitiator and a polymerizable compound and an ink composition B including a color material and a polymerizable compound are each individually discharged and are mixed on a recording medium to be photoset by irradiation with light, wherein the ink composition A and/or ink composition B includes a sensitizer.

DESCRIPTION OF EXEMPLARY EMBODIMENTS

The present invention provides a two-constituent photo curable ink composition set that has better photo curing sensitivity and storage stability, and that also allows low-yellowing radical polymerization photoinitiators to react more efficiently, as well as a recording method employing and recordings employing the ink composition set.

Embodiments of the invention are described below. The following embodiments are examples illustrating the invention and are not intended to limit the invention to these examples alone. The present invention can be worked in a variety of aspects without departing from the spirit of the invention.

The photo curable ink composition set of the invention is composed of an ink composition A that includes at least a color material, a polymerizable compound, and a radical polymerization photoinitiator, and an ink composition B that includes at least a radical polymerizable compound but no color material or radical polymerization photoinitiator, wherein the ink composition A and/or B includes a sensitizer.

This two-constituent photo curable ink composition set can be used to improve the photo curing sensitivity and storage stability, and to enable the efficient reaction of low-yellowing radical polymerization photoinitiators.

The photo curable ink composition set (two-constituent photo curable ink set) of the invention also includes an ink composition A that includes a radical polymerization photoinitiator and a polymerizable compound, and an ink composition B that includes a color material and a polymerizable compound, wherein the ink composition A and/or ink composition B includes a sensitizer, and the ink composition A and ink composition B are mixed and then photoset by irradiation with light.

This two-constituent photo curable ink composition set can be used to improve the photo curing sensitivity and to enable the efficient reaction of low-yellowing radical polymerization photoinitiators.

The ink composition A and ink composition B are mixed and then photoset by irradiation with light. In the present invention, the ink compositions A and B may be allowed to adhere to the same locations on a recording medium so as to be mixed on the recording medium and then photoset by irradiation with light. Alternatively, the ink compositions A and B may be mixed, then allowed to adhere on the recording medium while in a mixed state, and then photoset by irradiation with light.

In the present invention, either ink composition A or B may include a sensitizer, or both ink composition A and B may include a sensitizer.

The photo curable ink composition of the invention must include at least the ink compositions A and B, and may also include other ink compositions.

The ink composition A and/or ink composition B may include a sensitizer, as noted above.

Sensitizers are compounds that produce radicals by hydrogen extraction upon being excited through the absorption of light of the wavelength with which the ink composition A and/or B have been irradiated for the purpose of photosetting, compounds that produce radicals by energy transfer, and compounds that produce radicals by electron transfer.

From the standpoint of the UV ray or light absorption capacity, the sensitizer in the present invention is preferably a compound that is used as a color material. Because of the ready energy transfer, and from the standpoint of the active hydrogen extraction capacity, the sensitizer is more preferably one, or a mixture of two or more, anthracene compounds, thioxanthone compounds, or coumarin compounds, and is even more preferably one, or a mixture of two or more, thioxanthone compounds or coumarin compounds.

Desirable examples of thioxanthone compounds include thioxanthone, isopropylthioxanthone, 2,4-diethylthioxanthone, and chlorothioxanthone.

It is believed that coumarin compounds not only bring about sensitization as a result of the transfer of energy with other molecules when in an excited state upon the absorption of UV rays, but that they also characteristically emit fluorescent light when out of a ground state, and that the fluorescent light that is produced through irradiation with light is absorbed by the polymerization initiator, resulting in enhanced sensitivity. The two-constituent photo curable ink of the invention is particularly effective for thicker print. The irradiated light may have trouble reaching the interior of thick print, but through the action of coumarin compounds noted above, fluorescent light is emitted from inside the ink, thus enhancing the sensitivity and allowing print with better internal curing properties to be obtained.

Desirable examples of coumarin compounds include coumarin, 4-methylcoumarin, 7-hydroxycoumarin, 7-amino-4-methylcoumarin, 7-hydroxy-4-trifluoromethylcoumarin, 3-(2-benzothiazoyl)-7-(diethylamino)coumarin, 7-acetoxy-3-(2-benzothiazoyl)coumarin, 6,7-diethoxy-4-(trifluoromethyl)coumarin, and 2,3,6,7-tetrahydro-9-methyl-1H,5H-quinolidino(9,1-gh)coumarin.

The concentration of the sensitizer should be 0.01 wt % to 1.0 wt % in the ink composition A and/or ink composition B.

Specifically, when the ink composition A contains a sensitizer, the sensitizer concentration should be 0.01 wt % to 1.0 wt % in the ink composition A, and when the ink composition B contains a sensitizer, the sensitizer concentration should be 0.01 wt % to 1.0 wt % in the ink composition B.

The ink composition A and ink composition B should both be composed of nonvolatile components. Specifically, All the components included in the ink composition A and ink composition B should be nonvolatile components.

In the present invention, volatile components mean substances having a vapor pressure equal to or greater than that of water at ambient temperature and pressure, and nonvolatile components mean substances having vapor pressure lower than that of water.

Producing a structure such as this will allow the above effects to be achieved even better, and the absence of components that are not involved in the polymerization reaction can improve adhesion and prevent the cured material from separating from the recording medium.

In the present invention, the ink composition A or ink composition B will preferably include an allyl compound, and even more preferably an allyl ether compound, as the polymerizable compound. The allyl ethers are preferably allyl glycols, such as ethylene glycol monoallyl ether, trimethylol propane diallyl ether, trimethylol propane monoallyl ether, glycerin monoallyl ether, allyl glycidyl ether, or pentaerythritol triallyl ether, and especially ethylene glycol monoallyl ether and trimethylol propane diallyl ether. These may be used alone or in conjunction with other allyl compounds such as N-vinyl compounds (such as N-vinyl formamide).

Ethylene glycol monoallyl ether or N-vinyl compounds are monofunctional radical polymerizable monomers which are suitable for use, with little tendency to produce undesirable polymerization as a result of dark reaction during storage. Allyl ether compounds such as ethylene glycol monoallyl ether and trimethylol propane diallyl ether in particular are characteristically unable to undergo polymerization on their own, even in the presence of carbon radicals produced by the decomposition of radical polymerization photoinitiators.

Examples of N-vinyl compounds include N-vinyl formamide, N-vinyl carbazole, N-vinyl acetamide, N-vinyl pyrrolidone, N-vinyl caprolactam, and derivatives thereof. N-vinyl formamide is particularly desirable.

Adding an allyl compound in an amount less than 20 wt % to the ink composition A will result in problems with the ink composition viscosity, dispersion stability, storage stability, and the like, whereas adding more than 80 wt % may result in a two-constituent photo curable ink composition with inadequate curability and film strength. A range of 20 wt % to 70 wt % is more desirable.

In the present invention, the ink composition A or ink composition B preferably includes a dendritic polymer as the radical polymerizable compound.

Dendritic polymers can keep the viscosity lower than linear polymers of the same molecular weight because the three-dimensional branched structure is repeated and is highly branched.

Examples of dendritic polymers include (I) dendrimers, (II) linear dendritic polymers, (III) dendritic graft polymers, (IV) hyperbranched polymers, (V) star hyperbranched polymers, and (VI) hypergrafted polymers. Of these, (I) to (III) have a degree of branching (DB) of 1 and a structure that is free of defects, whereas (IV) to (VI) have a random branched structure that may include defects.

The dendritic polymer is preferably a hyperbranched polymer and/or dendrimer. Hyperbranched polymers and dendrimers may each be used singly or in conjunction with other types of dendritic polymers or dendrimers.

Examples of methods for the synthesis of dendritic polymers include divergent methods of synthesis from the center outward, and convergent methods of synthesis toward the center from outside.

Hyperbranched polyethylene glycol and the like can be used as the hyperbranched polymer, for example. A hyperbranched polymer can be obtained by synthesizing the targeted polymer in a single stage using a monomer having, per molecule, two or more types of reaction points corresponding to a branch portion, and just one different type of reaction point corresponding to a linking portion, (Macromolecules, Vol. 29 (1996), pp. 3831-3838). A 3,5-dihydroxybenzoic acid derivative is an example of a monomer for use as a hyperbranched polymer.

An example of a method for manufacturing a hyperbranched polymer is to heat methyl 3,5-bis((8'-hydroxy-3',6'-dioxaoctyl)oxy)benzoate (which is a hydrolysate of methyl 3,5-bis((8'-(t-butyldiphenylsiloxy)-3',6'-dioxaoctyl) oxy) benzoate obtained from 1-bromo-8-(t-butyldiphenylsiloxy)-3,6-dioxaoctane and methyl 3,5-dihydroxybenzoate) along with dibutyltin diacetate in a nitrogen atmosphere, thereby synthesizing a poly[bis(triethylene glycol) benzoate], which is a hyperbranched polymer.

When 3,5-dihydroxybenzoic acid is used, the hyperbranched polymer terminal groups are hydroxyl groups, allowing hyperbranched polymers having various kinds of terminal group to be synthesized by using reactants that are suitable for these hydroxyl groups.

Examples of dendrimers include the amidoamine dendrimers disclosed in U.S. Pat. Nos. 4,507,466, 4,558,120, 4,568,737, 4,587,329, 4,631,337, and 4,694,064, and the phenyl ether dendrimers disclosed in U.S. Pat. No. 5,041,516 and the Journal of American Chemistry, Vol. 112 (1990), pp. 7638-7647. Amidoamine dendrimers having terminal amino groups and methyl carboxylate esters group are commercially available as Starburst™ (PAMAM) by Aldrich. The terminal amino groups of these amidoamine dendrimers can react with a variety of acrylic acid derivatives and methacrylic acid derivatives to synthesize amidoamine dendrimers with the corresponding terminals, which can then be used.

Examples of acrylic acid derivatives and methacrylic acid derivatives which can be used include, but are not limited to, methyl, ethyl, n-butyl, t-butyl, cyclohexyl, palmityl, stearyl or other acrylic acid or methacrylic acid alkyl esters, and acrylic amides, isopropylamides or other acrylic acid or methacrylic acid alkylamides.

A variety of phenyl ether dendrimers have been noted in the Journal of American Chemistry, Vol. 112 (1990), pp. 7638-7647, where it is stated, for example, that 3,5-dihydroxybenzyl alcohol is used to synthesize a second generation benzyl alcohol by reaction with 3,5-diphenoxybenzyl bromide, $CBr_4$ and triphenyl phosphine are used to convert the OH groups to Br, next generation benzyl alcohols are then similarly synthesized by reaction with 3,5-dihydroxybenzyl alcohol, and the above reactions are repeated to synthesize the desired dendrimers. The terminals of phenyl ether dendrimers can also be substituted with a variety of structures other than terminal benzyl ether bonds. When synthesizing the dendrimers noted in the Journal of American Chemistry, Vol. 112 (1990), pp. 7638-7647, for example, a variety of alkyl halides can be used instead of the above benzyl bromide to obtain phenyl ether dendrimers having terminal structures with the corresponding alkyl groups. In addition, the polyamine dendrimers given in Macromol. Symp. 77, 21 (1994) and derivatives with modified terminal groups can be used as polyamine dendrimers.

The characteristics of hyperbranched polymers and dendrimers are governed by the chemical structure of the main chain and by the chemical structure of the terminal groups, but these characteristics will vary greatly depending on differences in the terminal groups or the substituents in the chemical structure in particular. Those with terminal polymerizable groups are particularly useful because of their greater reactivity and thus better gelling effects.

The hyperbranched polymers and dendrimers should be solids at room temperature, preferably with a number average molecular weight of 1000 to 100,000, and more preferably 2000 to 50,000. A molecular weight below the above range will result in fixed images that are fragile, whereas a molecular weight above this range will result in ink viscosity that is too high, even when added in lower amounts, which will be impractical in terms of discharge characteristics.

The hyperbranched polymers and dendrimers should also have radical polymerizable functional groups on the outermost surface. A radical polymerizable structure on the outermost surface will allow polymerization reaction to progress rapidly.

The dendritic polymer should be added in an amount ranging from about 3 wt % to 30 wt % to the ink composition B to ensure a suitable two-constituent photo curable ink composition set. A range of about 5 wt % to 25 wt % is even more desirable. Adding less than 3 wt % dendritic polymer will result in a two-constituent photo curable ink set with poor curability, whereas more than 30 wt % may cause problems with the ink viscosity, dispersion stability, storage stability, and the like.

The ink composition B may also include the allyl compounds proposed for use as radical polymerizable compounds in the ink composition A The ink composition A and/or ink composition B may also contain other polymerizable compounds. The other polymerizable compounds are not particularly limited. Monomers are an example.

Monomer refers to molecules that can serve as the structural units in the basic structure of macromolecules. The monomers used in the present invention are also referred to as photopolymerizable monomers, and include monofunctional monomers, difunctional monomers, and polyfunctional monomers, all of which can be used. All monomers should have a PII (primary irritation index) of 2 or less.

The ink composition A and/or ink composition B may also contain oligomers in addition to the above monomers as other polymerizable compounds.

The radical polymerization photoinitiators included in the ink composition A of the invention are not particularly limited, although α-aminoketones, α-hydroxyketones, and acyl phosphine oxides are preferred. Examples include α-hydroxyalkylphenones, α-aminoalkylphenones, monoacyl phosphine oxides, and bisacyl phosphine oxides.

These radical polymerization photoinitiators are included in the ink composition to allow radicals to be produced through the absorption of light of the wavelength with which the ink composition has been irradiated for the purpose of photosetting, allowing the curing reaction to take place.

Radical polymerization photoinitiators commercially available by the tradename of Irgacure 127, 184, 2959, 369, 379, 907, 1700, 1800, 1850, 1870, 819, and 4625, Darocur 1173, and TPO (all by Ciba Geigy Specialty Chemicals) can also be used.

The radical polymerization photoinitiator is preferably added in an amount of 0.1 wt % to 15 wt %, and more preferably 0.5 wt % to 10 wt %, in the ink composition A. Adding too little will result in greater oxygen inhibition and poor curing because of the low rate of polymerization. Adding too much will result in a cured product with a low molecular weight, and thus a cured product with poor durability.

The ink composition A and/or the ink composition B may contain at least one type of surfactant.

The surfactant is preferably a polyether-modified polydimethylsiloxane, a polyester-modified polydimethylsiloxane, or the like.

Specific examples include BYK-347, BYK-348, BYK-UV3500, 3510, 3530, and 3570 (by BYK-Chemie Japan).

The ink composition A and/or the ink composition B may include at least one type of amine-based polymerization accelerator.

Examples of amine-based polymerization accelerators include the aminobenzoates Darocur EHA and EDB (by Ciba Specialty Chemicals).

The ink composition A and/or ink composition B may include a hindered phenol compound or HALS radical thermopolymerization inhibitor to enhance the storage stability of the ink composition.

An example of a hindered phenol compound is Irgastab UV-22 (by Ciba Specialty Chemicals), while an example of a HALS radical thermopolymerization inhibitor is Irgastab UV-10 (by Ciba Specialty Chemicals).

The color materials used in the invention may be dyes or pigments, although pigments are more advantageous in terms of print durability.

Various dyes commonly used for inkjet recording, such as direct dyes, acidic dyes, food dyes, basic dyes, reactive dyes, disperse dyes, vat dyes, and soluble vat dyes, can be used as the dyes in the invention.

Inorganic and organic pigments can be used without any particularly restrictions as pigments in the invention.

Titanium oxide and iron oxides, as well as carbon black produced by well-known methods such as contact methods, furnace methods, and thermal methods, can be used as inorganic pigments. Examples of organic pigments which can be used include azo pigments (including azo lakes, insoluble azo pigments, condensed azo pigments, and chelated azo pigments), polycyclic pigments (such as phthalocyanin pigments, perylene pigments, perinone pigments, anthraquinone pigments, quinacridone pigments, dioxazine pigments, thioindigo pigments, isoindolinone pigments, and quinophthalone pigments), dye chelates (such as the basic dye type chelate and the acid dye type chelate), nitro pigments, nitroso pigments, and aniline black.

Specific examples of pigments include carbon blacks such as No. 2300, No. 900, MCF88, No. 33, No. 40, No. 45, No. 52, MA7, MA8, MA100, No. 2200B, and so forth by Mitsubishi Chemicals; Raven 5750, 5250, 5000, 3500, 1255, 700, and so forth by Columbia; Regal 400R, 330R, and 660R, Mogul L and 700, Monarch 800, 880, 900, 1000, 1100, 1300, and 1400, and so forth by Cabot; Color Black FW1, FW2, FW2V, FW18, and FW200, Color Black S150, S160, and S170, Printex 35, U, V, and 140U, and Special Black 6, 5, 4A, and 4, and so forth by Degussa.

Examples of pigments used for yellow ink include C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213.

Examples of pigments used for magenta ink include C.I. Pigment Red 5, 7, 12, 48(Ca), 48(Mn), 57(Ca), 57:1, 112, 122, 123, 168, 184, 202, 209, and C.I. Pigment Violet 19.

Pigments used for cyan ink include C.I. Pigment Blue 1, 2, 3, 15:3, 15:4, 60, 16, and 22.

According to a desirable embodiment of the invention, the organic or inorganic pigment should have a mean particle diameter of 10 to 200 nm, and preferably about 50 to 150 nm.

Metal pigments based on metals such as gold, silver, copper, aluminum, brass, and titanium, either by themselves or in the form of alloys, or hollow white resin emulsion pigments can also be used as colorants (color materials), in which case the man particle diameter should be 100 nm to 5 μm, and preferably about 300 nm to 3 μm.

The color material is preferably added in an amount of 0.1 to 25 wt %, and more preferably 0.5 to 15 wt %, to the ink composition A.

The ink composition A can be produced using the pigments in the form of a pigment dispersion obtained by dispersion in a polymerizable compound medium with a dispersant or surfactant.

Examples of desirable dispersants include dispersants commonly used to prepare pigment dispersions, such as macromolecular dispersants (polyoxyakylene polyalkylene polyamine, etc.).

When the ink composition includes a color material, the ink composition containing the color material may have a plurality of colors for each color. For example, when darker and lighter colors of the same series are added to each color in addition to the four basic colors of yellow, magenta, cyan, and black, magenta may also include light magenta as the light color and dark red as the dark color, cyan may include light cyan as the light color and dark blue as the dark color, and black may include gray and light black as the light colors and matte black as the dark color.

The ink composition A and/or ink composition B may also include microparticles that contain insoluble fluorescent color materials, fluorescent brighteners, and fluorescent color materials. The inclusion of such microparticles results in the distinctive effect of masking complementary yellow colors to look whiter because these colors characteristically absorb light of a certain wavelength and release visible blue light of longer wavelengths.

Wetting agents, penetrating solvents, pH regulators, antiseptics, fungicides, and the like may also be added to the ink composition A or B as other well-known components that can be used in UV-setting inks.

Leveling additives and matting agents, as well as polyester resins, polyurethane resins, vinyl resins, acrylic resins, rubber resins, or waxes for adjusting the film properties can also be added as needed.

The photo curable ink composition of the invention is irradiated with light to bring about a photosetting reaction.

The recording method of the invention is a recording method in which the ink composition A including a radical polymerization photoinitiator and polymerizable compound and the ink composition B including a color material and polymerizable compound are mixed and are then discharged onto a recording medium to be photoset by irradiation with light, wherein the ink composition A and/or ink composition B include a sensitizer.

The recording method of the invention is also a recording method in which an ink composition A including a radical polymerization photoinitiator and a polymerizable compound and an ink composition B including a color material and a polymerizable compound are each individually discharged and are mixed on a recording medium to be photoset by irradiation with light, wherein the ink composition A and/or ink composition B includes a sensitizer.

The sensitizer is preferably a sensitizer described above.

UV irradiation is preferred when the photosetting reaction is brought about by the irradiation of light.

Examples of lamps used for ultraviolet irradiation include lamps such as metal halide lamps, xenon lamps, carbon arc lamps, chemical lamps, low pressure mercury lamps, and high pressure mercury lamps. For example, commercially available ones such as the H lamp, D lamp, or V lamp by Fusion System can be used.

UV irradiation can also be accomplished using an ultraviolet ray light emitting semiconductor element such as a UV ray light emitting diode (UV LED) or a UV ray light emitting semiconductor laser.

The invention is illustrated in further detail by, but is not limited to, the following examples. One having ordinary skill in the art will be able to work the invention with the addition of various modifications, not just the examples given below, such modifications being encompassed within the scope of the invention.

Example 1

In the following examples (including the comparative examples), 2,4-diethylthioxanthone was used as the thioxanthone sensitizer. 3-(2-benzothiazoyl)-7-diethylaminocoumarin (hereinafter referred to as "BzTDAC") was used as the coumarin sensitizer.

"Allyl glycol" was used as the polymerizable compound (allyl compound), and "Viscoat #1000" and "STAR-501" by Osaka Organic Chemical Industry were used as the radical polymerizable compounds (hyperbranched polymers). Viscoat #1000 and STAR-501 are hyperbranched polymers in which dipentaerythritol serves as a core from which functional groups branch off. Viscoat #1000 contains ethylene glycol diacrylate as a dilution monomer, and has a viscosity of 273 mPa·s and 14 functional groups (acrylic groups). STAR-501 contains dipentaerythritol hexacrylate as a dilution monomer, and has a viscosity of 210 mPa·s and 20 to 99 functional groups (acrylic groups). Both have acryloyl groups on the outermost surface, making them suitable for use.

Also, because of their high stereospecificity, dendrimers require more manufacturing steps and are expensive, whereas the stereospecificity of hyperbranched polymers are not that high and can be synthesized relatively easy, making them more advantageous in terms of cost.

Dendrimer 7 was synthesized in the following manner.

31 g ethylene diamine, 256 g dimethyl acrylate, and 300 g methanol were introduced into a 1 L reactor, and a reaction was brought about for 6 hours as the contents were stirred at 40° C. in a nitrogen stream. Following the conclusion of the reaction, the methanol was distilled off from the resulting mixture using a rotary evaporator, and the product was purified by being precipitated again upon being added to an excess of diethyl ether. The resulting reaction product 1 was dissolved with the addition of 500 g methanol, and the following reaction was carried out.

A methanol solution containing the reaction product 1 was introduced into a 2 L reactor, 240 g ethylene diamine was added, and a reaction was brought about for 6 hours as the contents were stirred at 27° C. in a nitrogen stream. After the reaction, the methanol was similarly distilled off, the product was purified by re-precipitation, the resulting reaction product 2 was dissolved with the addition of 1000 g methanol, and the following reaction was carried out.

A methanol solution containing the reaction product 2 was introduced into a 5 L reactor, 667 g dimethyl acrylate was added, and a reaction was brought about for 6 hours as the contents were stirred at 40° C. in a nitrogen stream. After the reaction, the methanol was similarly distilled off, the product was purified by re-precipitation, the resulting reaction product 3 was dissolved with the addition of 2000 g methanol, and the following reaction was carried out.

A methanol solution containing the reaction product 3 was introduced into a reactor, 361 g ethylene diamine was added, and a reaction was brought about for 6 hours as the contents were stirred at 27° C. in a nitrogen stream. After the reaction, the methanol was similarly distilled off, the resulting reaction product 4 was dissolved with the addition of 2000 g acetone which had been dehydrated using a molecular sieve, and the following reaction was carried out.

1000 g acetone solution containing the reaction product 4 was portioned off into a reactor, 2153 g Karenz BEI (1,1-bis(acryloyloxymethyl)ethyl isocyanate, by Showa Denko) was added, the contents were stirred and mixed in a nitrogen stream, 1 g of DABCO (1,4-diazabicyclo[00682]octane, by Tokyo Chemical Industry Co., Ltd.) was also added, the contents were stirred and mixed, and a reaction was brought about for 6 hours after the reaction temperature had been increased to 50° C. After the conclusion of the reaction, the acetone was distilled off using a rotary evaporator, 6838 g ethylene glycol monoallyl ether was added, giving a 30 wt % ethylene glycol monoallyl ether solution 8 of the dendrimer 7.

In this case, the dendrimer 7 had 72 acryloyl groups on the outermost surface per molecule.

Irgacure 819 and 127 (Ciba Geigy Specialty Chemicals) were used as the radical polymerization photoinitiators. Polyoxyalkylene polyalkylene polyamine was used as the dispersant.

Preparation of Pigment Dispersion

Ethylene glycol monoallyl ether was added as the monomer to 15 weight parts C.I. Pigment Black-7 (carbon black) as colorant and 6.0 weight parts Discol N-509 (by Dainichiseika Color & Chemicals Mfg. Co., Ltd.) as the dispersant, bringing the total to 100 weight parts, and the ingredients were mixed and stirred, giving a mixture.

The mixture underwent a 6-hour dispersion treatment along with zirconia beads (1.5 mm in diameter) using a sand mill (by Yasukawa Seisakusho). The zirconia beads were then separated by a separator, giving a black pigment dispersion ("Pigment Black-7" in Tables 1 through 9 below).

Pigment dispersions corresponding to various other colors, i.e., a cyan pigment dispersion ("Pigment Blue-15:3" in Tables 1 through 8 below), a magenta pigment dispersion ("Pigment Violte-19" in Tables 1 through 8 below), and a yellow pigment dispersion ("Pigment Yellow-155" in Tables 1 through 8 below), were prepared in the same manner as above.

Preparation of Ink Compositions A1-1 through 1-4, Ink Compositions A2-1 through 2-4 (see Tables 1 and 4)

Allyl glycol, radical polymerization photoinitiators (Irgacure 819 and 127), dispersant (polyoxyalkylene polyalkylene polyamine), and sensitizers were mixed and completely dissolved in the compositions (wt %) shown in Tables 1 and 4, and the above pigment dispersions (Pigment Black-7, Pigment Blue-15:3, Pigment Violte-19, and Pigment Yellow-155) were stirred therein in the form of drops (see Tables 1 and 4 for amounts). After the conclusion of dropwise addition, the contents were mixed and stirred for 1 hour at ambient temperature, and the products were filtered through 5 μm membrane filters, giving Ink Compositions A1-1 through 1-4 and Ink Compositions A2-1 through 2-4.

Preparation of Ink Compositions A1-5 through 1-8, Ink Compositions A2-5 through 2-8 (see Tables 2 and 5)

Allyl glycol, hyperbranched polymer (STAR-501), radical polymerization photoinitiators (Irgacure 819 and 127), and sensitizers were mixed and completely dissolved in the compositions (wt %) shown in Tables 2 and 5, and the products were filtered through 5 μm membrane filters, giving Ink Compositions A1-5 through 1-8 and Ink Compositions A2-5 through 2-8.

Preparation of Ink Compositions A1-9 through 1-12, Ink Compositions A2-9 through 2-12 (see Tables 3 and 6)

Allyl glycol, hyperbranched polymer (STAR-501), and dispersant (polyoxyalkylene polyalkylene polyamine) were mixed and completely dissolved in the compositions (wt %) shown in Tables 3 and 6, and the above pigment dispersions (Pigment Black-7, Pigment Blue-15:3, Pigment Violte-19, and Pigment Yellow-155) were stirred therein in the form of drops (see Tables 3 and 6 for amounts). After the conclusion of dropwise addition, the contents were mixed and stirred for 1 hour at ambient temperature, and the products were filtered through 5 μm membrane filters, giving Ink Compositions A1-9 through 1-12 and Ink Compositions A2-9 through 2-12.

Preparation of Ink Compositions B1-1 through 1-4, Ink Compositions B2-1 through 2-4 (see Tables 1 and 4)

Allyl glycol, hyperbranched polymer (STAR-501), and sensitizers were mixed and completely dissolved in the compositions (wt %) shown in Tables 1 and 4, and the products were filtered through 5 μm membrane filters, giving Ink Compositions B1-1 through 1-4 and Ink Compositions B2-1 through 2-4.

Preparation of Ink Compositions B1-5 through 1-8, Ink Compositions B2-5 through 2-8 (see Tables 2 and 5)

Allyl glycol, radical polymerization photoinitiators (Irgacure 819 and 127), sensitizers, and dispersant (polyoxyalkylene polyalkylene polyamine) were mixed and completely dissolved in the compositions (wt %) shown in Tables 2 and 5, and the above pigment dispersions (Pigment Black-7, Pigment Blue-15:3, Pigment Violte-19, and Pigment Yellow-155) were stirred therein in the form of drops (see Tables 2 and 5 for amounts). After the conclusion of dropwise addition, the contents were mixed and stirred for 1 hour at ambient temperature, and the products were filtered through 5 μm membrane filters, giving Ink Compositions B1-5 through 1-8 and Ink Compositions B2-5 through 2-8.

Preparation of Ink Compositions B1-9 through 1-12, Ink Compositions B2-9 through 2-12 (see Tables 3 and 6)

Allyl glycol and hyperbranched polymer (STAR-501) were mixed and completely dissolved in the compositions (wt %) shown in Tables 3 and 6, and the products were filtered through 5 μm membrane filters, giving Ink Compositions B1-9 through 1-12 and Ink Compositions B2-9 through 2-12.

Examples 1-1 through 1-4, Comparative Examples 1-1 through 1-8, Examples 2-1 through 2-4, and Comparative Examples 2-1 through 2-8

The photo curable compositions of Examples 1-1 through 1-4, Comparative Examples 1-1 through 1-8, Examples 2-1 through 2-4, and Comparative Examples 2-1 through 2-8 are given in Tables 1 through 6 below.

The photo curable ink composition sets in the examples and comparative examples underwent the following "storage stability test," "channel storage stability test," and "setting test," the results (evaluation) of which are included in Tables 1 through 6.

Storage Stability Test

The ink compositions A and B of the examples and comparative examples were allowed to stand for 7 days at 60° C., and the initial viscosity (mPa·s) and the viscosity after being allowed to stand for that period of time were assessed using the percentage of change in viscosity based on the following indicators using a rheometer (MCR-300 by Physica).

AA: Percentage of change between initial and later viscosity less than 5%

A+: Percentage of change between initial and later viscosity≧5%<9%.

A−: Percentage of change between initial and later viscosity≧9%<12.5%.

B: Percentage of change between initial and later viscosity≧12.5%.

Channel Storage Stability Test

The appearance of the ink compositions A and B of the examples and comparative examples in the supply tubes was observed three hour after printing when slight leakage of UV rays used during the curing process shone on the supply tubes up to where they were filled with the ink, and the state of the ink was assessed based on the following indicators.

A: ink in supply tubes was not cured

B: gelation of ink in supply tubes observed

Setting Test

When the ink compositions A and ink compositions B prepared above were mixed, the setting properties were assessed using a Physica MCR-301 rheometer (with a UV setting properties measurement option) by Anton Paar Co.

Specifically, the setting properties were assessed by measuring the UV dose (mW/cm$^2$) of the UV ray source beforehand, initiating photopolymerization by UV ray irradiation, measuring the time (sec) until the increase in the elastic modulus became constant as the curing reaction progressed, and determining the energy (mJ/cm$^2$) needed for curing from the UV dose (mW/cm$^2$)×time (sec).

The energy needed for curing varies considerably depending on the color of the colorant. For example, black tends to absorb UV rays more readily than other colorants, and ink containing it therefore needs more energy. The effect of the addition of the sensitizer in reducing the energy that is needed therefore requires comparison between the same inks.

Comparison of the same colors in Tables 1 and 3 (Example 1-1 and Comparative Example 1-5, Example 1-2 and Comparative Example 1-6, Example 1-3 and Comparative Example 1-7, Example 1-4 and Comparative Example 1-8) revealed that far less energy was needed.

Comparison of the same colors in Tables 4 and 6 (Example 2-1 and Comparative Example 2-5, Example 2-2 and Comparative Example 2-6, Example 2-3 and Comparative Example 2-7, Example 2-4 and Comparative Example 2-8) also revealed that far less energy was needed.

The ink compositions of the examples also had better storage stability.

TABLE 1

|  | Example 1-1 | | Example 1-2 | | Example 1-3 | | Example 1-4 | |
| --- | --- | --- | --- | --- | --- | --- | --- | --- |
|  | Ink comp. A1-1 | Ink comp. B1-1 | Ink comp. A1-2 | Ink comp. B1-2 | Ink comp. A1-3 | Ink comp. B1-3 | Ink comp. A1-4 | Ink comp. B1-4 |
| Allyl glycol | 87.6 | 70 | 87.6 | 70 | 87.2 | 70 | 87.8 | 70 |
| Hyperbranched polymer (STAR-501) | — | 30 | — | 30 | — | 30 | — | 30 |
| Irgacure 819 | 4 | — | 4 | — | 4 | — | 4 | — |
| Irgacure 127 | 1 | — | 1 | — | 1 | — | 1 | — |
| Pigment Black 7 | 6 | — | — | — | — | — | — | — |
| Pigment Blue 15:3 | — | — | 6 | — | — | — | — | — |
| Pigment Violet 19 | — | — | — | — | 6 | — | — | — |
| Pigment Yellow 155 | — | — | — | — | — | — | 6 | — |
| Dispersant (polyoxyalkylene polyalkylene polyamine) | 1.4 | — | 1.4 | — | 1.8 | — | 1.2 | — |
| Sensitizer (thioxanthone compound) | 0.01 | 0.1 | 0.01 | 0.1 | 0.01 | 0.1 | 0.01 | 0.1 |
| Storage stability (60° C. × 7 days) | AA | AA | AA | AA | AA | AA | AA | AA |
| Stability in channel | A | A | A | A | A | A | A | A |
| Setting properties (mJ/cm$^2$) (energy needed for setting when A and B inks mixed) | 10300 | | 2300 | | 1100 | | 2600 | |

TABLE 2

|  | Comp. Ex. 1-1 | | Comp. Ex. 1-2 | | Comp. Ex. 1-3 | | Comp. Ex. 1-4 | |
| --- | --- | --- | --- | --- | --- | --- | --- | --- |
|  | Ink comp. A1-5 | Ink comp. B1-5 | Ink comp. A1-6 | Ink comp. B1-6 | Ink comp. A1-7 | Ink comp. B1-7 | Ink comp. A1-8 | Ink comp. B1-8 |
| Allyl glycol | 78 | 70 | 78 | 70 | 78 | 70 | 78 | 70 |
| Hyperbranched polymer (STAR-501) | 17 | 22.6 | 17 | 22.6 | 17 | 22.2 | 17 | 22.8 |
| Irgacure 819 | 4 | — | 4 | — | 4 | — | 4 | — |
| Irgacure 127 | 1 | — | 1 | — | 1 | — | 1 | — |
| Pigment Black 7 | — | 6 | — | — | — | — | — | — |
| Pigment Blue 15:3 | — | — | — | 6 | — | — | — | — |
| Pigment Violet 19 | — | — | — | — | — | 6 | — | — |
| Pigment Yellow 155 | — | — | — | — | — | — | — | 6 |
| Dispersant (polyoxyalkylene polyalkylene polyamine) | — | 1.4 | — | 1.4 | — | 1.8 | — | 1.2 |
| Sensitizer (thioxanthone compound) | 0.01 | 0.1 | 0.01 | 0.1 | 0.01 | 0.1 | 0.01 | 0.1 |
| Storage stability (60° C. × 7 days) | AA | B | AA | B | AA | B | AA | B |
| Stability in channel | A | B | A | B | A | B | A | B |
| Setting properties (mJ/cm$^2$) (energy needed for setting when A and B inks mixed) | 11300 | | 2500 | | 1200 | | 2900 | |

TABLE 3

|  | Comp. Ex. 1-5 | | Comp. Ex. 1-6 | | Comp. Ex. 1-7 | | Comp. Ex. 1-8 | |
| --- | --- | --- | --- | --- | --- | --- | --- | --- |
|  | Ink comp. A1-9 | Ink comp. B1-9 | Ink comp. A1-10 | Ink comp. B1-10 | Ink comp. A1-11 | Ink comp. B1-11 | Ink comp. A1-12 | Ink comp. B1-12 |
| Allyl glycol | 87.6 | 70 | 87.6 | 70 | 87.2 | 70 | 87.8 | 70 |
| Hyperbranched polymer (STAR-501) | — | 30 | — | 30 | — | 30 | — | 30 |
| Irgacure 819 | 4 | — | 4 | — | 4 | — | 4 | — |
| Irgacure 127 | 1 | — | 1 | — | 1 | — | 1 | — |
| Pigment Black 7 | 6 | — | — | — | — | — | — | — |
| Pigment Blue 15:3 | — | — | 6 | — | — | — | — | — |
| Pigment Violet 19 | — | — | — | — | 6 | — | — | — |
| Pigment Yellow 155 | — | — | — | — | — | — | 6 | — |
| Dispersant (polyoxyalkylene polyalkylene polyamine) | 1.4 | — | 1.4 | — | 1.8 | — | 1.2 | — |
| Sensitizer (thioxanthone compound) | — | — | — | — | — | — | — | — |
| Storage stability (60° C. × 7 days) | AA | A+ AA | A+ AA | A+ AA | | | | |
| Stability in channel | A | A | A | A | A | A | A | A |
| Setting properties (mJ/cm$^2$) (energy needed for setting when A and B inks mixed) | 15500 | | 3500 | | 1800 | | 4000 | |

TABLE 4

|  | Example 2-1 | | Example 2-2 | | Example 2-3 | | Example 2-4 | |
| --- | --- | --- | --- | --- | --- | --- | --- | --- |
|  | Ink comp. A2-1 | Ink comp. B2-1 | Ink comp. A2-2 | Ink comp. B2-2 | Ink comp. A2-3 | Ink comp. B2-3 | Ink comp. A2-4 | Ink comp. B2-4 |
| Allyl glycol | 87.6 | 70 | 87.6 | 70 | 87.2 | 70 | 87.8 | 70 |
| Hyperbranched polymer (STAR-501) | — | 30 | — | 30 | — | 30 | — | 30 |
| Irgacure 819 | 4 | — | 4 | — | 4 | — | 4 | — |
| Irgacure 127 | 1 | — | 1 | — | 1 | — | 1 | — |
| Pigment Black 7 | 6 | — | — | — | — | — | — | — |
| Pigment Blue 15:3 | — | — | 6 | — | — | — | — | — |
| Pigment Violet 19 | — | — | — | — | 6 | — | — | — |
| Pigment Yellow 155 | — | — | — | — | — | — | 6 | — |
| Dispersant (polyoxyalkylene polyalkylene polyamine) | 1.4 | — | 1.4 | — | 1.8 | — | 1.2 | — |
| Sensitizer (thioxanthone compound) | 0.01 | 0.1 | 0.01 | 0.1 | 0.01 | 0.1 | 0.01 | 0.1 |
| Storage stability (60° C. × 7 days) | AA | A+ | AA | A+ | AA | A+ | AA | A+ |
| Stability in channel | A | A | A | A | A | A | A | A |
| Setting properties (mJ/cm$^2$) (energy needed for setting when A and B inks mixed) | 10500 | | 2400 | | 1200 | | 2700 | |

TABLE 5

|  | Comp. Ex. 2-1 | | Comp. Ex. 2-2 | | Comp. Ex. 2-3 | | Comp. Ex. 2-4 | |
|  |  |  | Ink comp. B2-6 | | | | | |
| --- | --- | --- | --- | --- | --- | --- | --- | --- |
|  | Ink comp. A2-5 | Ink comp. B2-5 | Ink comp. A2-6 | Ink comp. A2-7 | Ink comp. B2-7 | Ink comp. A2-8 | Ink comp. B2-8 | |
| Allyl glycol | 78 | 70 | 78 | 70 | 78 | 70 | 78 | 70 |
| Hyperbranched polymer (STAR-501) | 17 | 22.6 | 17 | 22.6 | 17 | 22.2 | 17 | 22.8 |
| Irgacure 819 | 4 | — | 4 | — | 4 | — | 4 | — |
| Irgacure 127 | 1 | — | 1 | — | 1 | — | 1 | — |
| Pigment Black 7 | — | 6 | — | — | — | — | — | — |
| Pigment Blue 15:3 | — | — | — | 6 | — | — | — | — |
| Pigment Violet 19 | — | — | — | — | — | 6 | — | — |
| Pigment Yellow 155 | — | — | — | — | — | — | — | 6 |
| Dispersant (polyoxyalkylene polyalkylene polyamine) | — | 1.4 | — | 1.4 | — | 1.8 | — | 1.2 |
| Sensitizer (thioxanthone compound) | 0.01 | 0.1 | 0.01 | 0.1 | 0.01 | 0.1 | 0.01 | 0.1 |
| Storage stability (60° C. × 7 days) | AA | B | AA | B | AA | B | AA | B |
| Stability in channel | A | B | A | B | A | B | A | B |
| Setting properties (mJ/cm$^2$) (energy needed for setting when A and B inks mixed) | 11500 | | 2600 | | 1300 | | 3000 | |

TABLE 6

|  | Comp. Ex. 2-5 | | Comp. Ex. 2-6 | | Comp. Ex. 2-7 | | Comp. Ex. 2-8 | |
| --- | --- | --- | --- | --- | --- | --- | --- | --- |
|  | Ink comp. A2-9 | Ink comp. B2-9 | Ink comp. A2-10 | Ink comp. B2-10 | Ink comp. A2-11 | Ink comp. B2-11 | Ink comp. A2-12 | Ink comp. B2-12 |
| Allyl glycol | 87.6 | 70 | 87.6 | 70 | 87.2 | 70 | 87.8 | 70 |
| Hyperbranched polymer (STAR-501) | — | 30 | — | 30 | — | 30 | — | 30 |
| Irgacure 819 | 4 | — | 4 | — | 4 | — | 4 | — |
| Irgacure 127 | 1 | — | 1 | — | 1 | — | 1 | — |
| Pigment Black 7 | 6 | — | — | — | — | — | — | — |
| Pigment Blue 15:3 | — | — | 6 | — | — | — | — | — |
| Pigment Violet 19 | — | — | — | — | 6 | — | — | — |
| Pigment Yellow 155 | — | — | — | — | — | — | 6 | — |
| Dispersant (polyoxyalkylene polyalkylene polyamine) | 1.4 | — | 1.4 | — | 1.8 | — | 1.2 | — |
| Sensitizer (thioxanthone compound) | — | — | — | — | — | — | — | — |
| Storage stability (60° C. × 7 days) | AA | A+ | AA | A+ | AA | A+ | AA | A |
| Stability in channel | A | A | A | A | A | A | A | A |
| Setting properties (mJ/cm$^2$) (energy needed for setting when A and B inks mixed) | 15500 | | 3500 | | 1800 | | 4000 | |

Preparation of Ink Compositions A3-1 through 3-5, Ink Compositions A4-1 through 4-5 (see Tables 7 and 8)

Allyl glycol, radical polymerization photoinitiators (Irgacure 819 and 127), dispersant (polyoxyalkylene polyalkylene polyamine), and sensitizers (Table 7: thioxanthone compound; Table 8: coumarin compound) were mixed and completely dissolved in the compositions (wt %) shown in Tables 7 and 8, and the above pigment dispersions (Pigment Black-7, Pigment Blue-15:3, Pigment Violte-19, Pigment Yellow-213, and Pigment White 6) were stirred therein in the form of drops (see Tables 7 and 8 for amounts). After the conclusion of dropwise addition, the contents were mixed and stirred for 1 hour at ambient temperature, and the products were filtered through 5 μm membrane filters, giving Ink Compositions A3-1 through 3-5 and Ink Compositions A4-1 through 4-5.

Preparation of Ink Composition B3-1 and Ink Composition B4-1 (see Tables 7 and 8)

Allyl glycol, hyperbranched polymer (Viscoat #1000), and sensitizers (Table 7: thioxanthone compound; Table 8: coumarin compound) were mixed and completely dissolved in the compositions (wt %) shown in Tables 7 and 8, and the products were filtered through 5 μm membrane filters, giving Ink Composition B3-1 and Ink Composition B4-1.

Storage Stability Test, and Channel Storage Stability Test

The photo curable ink composition sets of the examples were tested by the same Storage Stability Test and Channel Storage Stability Test as in Example 1-1. The results (evaluation) are given in Tables 7 and 8.

Print Evaluation

The inks were used in a Seiko Epson Inkjet Printer PM-G920 to print full color images under conditions where the ink composition A3-1 was used for the photo black row, the ink composition B3-1 was used for the gloss optimizer row, the corresponding inks for each colored ink, that is, ink composition A3-2 for the yellow row, the ink composition A3-3 for the magenta row, the ink composition A3-4 for the cyan row, and the white ink composition A3-5 for the red and blue rows, and the ink composition B3-1 was propelled and mixed at the corresponding locations of the black, white, and colored inks at ambient temperature and pressure. The recording medium was A4 size OHP film (Xerox Film <unframed>, by Fuji Xerox). Printing and setting treatments were carried out with a UV light source having a total dosage of 120 mW/cm$^2$ under setting conditions in which the cumulative amount of light was 12000 mW/cm$^2$, and it was confirmed that full color images which had been obtained had been set (Examples 3-1 to 3-5).

It was also confirmed that full color images which had been set had been obtained after printing and setting treatment under setting conditions involving a cumulative amount of light of 12000 mW/cm$^2$ when the ink composition A4-1 was used for the photo black row, the ink composition B4-1 was used for the gloss optimizer row, the corresponding inks for each colored ink, that is, ink composition A4-2 for the yellow row, the ink composition A4-3 for the magenta row, the ink composition A4-4 for the cyan row, and the white ink composition A4-5 for the red and blue rows, and the ink composition B4-1 was propelled and mixed at the corresponding locations of the black, white, and colored inks at ambient temperature and pressure (Examples 4-1 through 4-5).

TABLE 7

| | Example 3-1 | | Example 3-2 | | Example 3-3 | | Example 3-4 | | Example 3-5 | |
|---|---|---|---|---|---|---|---|---|---|---|
| | Ink comp. A3-1 | Ink comp. B3-1 | Ink comp. A3-2 | Ink comp. B3-2 | Ink comp. A3-3 | Ink comp. B3-3 | Ink comp. A3-4 | Ink comp. B3-4 | Ink comp. A3-5 | Ink comp. B3-5 |
| Allyl glycol | 86.0 | 69.0 | 86.0 | 69.0 | 86.0 | 69.0 | 86.0 | 69.0 | 86.0 | 69.0 |
| Viscoat #1000 | — | 30.0 | — | 30.0 | — | 30.0 | — | 30.0 | — | 30.0 |
| Irgacure 819 | 4.0 | — | 4.0 | — | 4.0 | — | 4.0 | — | 4.0 | — |
| Irgacure 127 | 1.0 | — | 1.0 | — | 1.0 | — | 1.0 | — | 1.0 | — |
| Pigment Black 7 | 6.0 | — | — | — | — | — | — | — | — | — |
| Pigment Yellow 213 | — | — | 6.0 | — | — | — | — | — | — | — |
| Pigment Violet 19 | — | — | — | — | 6.0 | — | — | — | — | — |
| Pigment Blue 15:3 | — | — | — | — | — | — | 6.0 | — | — | — |
| Pigment White 6 | — | — | — | — | — | — | — | — | 6.0 | — |
| Dispersant (polyoxyalkylene polyalkylene polyamine) | 2.0 | — | 2.0 | — | 2.0 | — | 2.0 | — | 2.0 | — |
| Sensitizer (thioxanthone compound) | 1.0 | 1.0 | 1.0 | 1.0 | 1.0 | 1.0 | 1.0 | 1.0 | 1.0 | 1.0 |
| Storage stability (60° C. × 7 days) | AA | AA | AA | AA | AA | AA | AA | AA | AA | AA |
| Stability in channel | A | A | A | A | A | A | A | A | A | A |

TABLE 8

| | Example 4-1 | | Example 4-2 | | Example 4-3 | | Example 4-4 | | Example 4-5 | |
|---|---|---|---|---|---|---|---|---|---|---|
| | Ink comp. A4-1 | Ink comp. B4-1 | Ink comp. A4-2 | Ink comp. B4-2 | Ink comp. A4-3 | Ink comp. B4-3 | Ink comp. A4-4 | Ink comp. B4-4 | Ink comp. A4-5 | Ink comp. B4-5 |
| Allyl glycol | 86.7 | 69.7 | 86.7 | 69.7 | 86.7 | 69.7 | 86.7 | 69.7 | 86.7 | 69.7 |
| Viscoat #1000 | — | 30.0 | — | 30.0 | — | 30.0 | — | 30.0 | — | 30.0 |
| Irgacure 819 | 4.0 | — | 4.0 | — | 4.0 | — | 4.0 | — | 4.0 | — |

TABLE 8-continued

|  | Example 4-1 | | Example 4-2 | | Example 4-3 | | Example 4-4 | | Example 4-5 | |
| --- | --- | --- | --- | --- | --- | --- | --- | --- | --- | --- |
|  | Ink comp. A4-1 | Ink comp. B4-1 | Ink comp. A4-2 | Ink comp. B4-2 | Ink comp. A4-3 | Ink comp. B4-3 | Ink comp. A4-4 | Ink comp. B4-4 | Ink comp. A4-5 | Ink comp. B4-5 |
| Irgacure 127 | 1.0 | — | 1.0 | — | 1.0 | — | 1.0 | — | 1.0 | — |
| Pigment Black 7 | 6.0 | — | — | — | — | — | — | — | — | — |
| Pigment Yellow 213 | — | — | 6.0 | — | — | — | — | — | — | — |
| Pigment Violet 19 | — | — | — | — | 6.0 | — | — | — | — | — |
| Pigment Blue 15:3 | — | — | — | — | — | — | 6.0 | — | — | — |
| Pigment White 6 | — | — | — | — | — | — | — | — | 6.0 | — |
| Dispersant (polyoxyalkylene polyalkylene polyamine) | 2.0 | — | 2.0 | — | 2.0 | — | 2.0 | — | 2.0 | — |
| Sensitizer (coumarin compound) | 0.3 | 0.3 | 0.3 | 0.3 | 0.3 | 0.3 | 0.3 | 0.3 | 0.3 | 0.3 |
| Storage stability (60(C. (7 days)) | AA | AA | AA | AA | AA | AA | AA | AA | AA | AA |
| Stability in channel | A | A | A | A | A | A | A | A | A | A |

Examples 5-1 to 5-2, and Comparative Examples 5-1 to 5-2

Table 9 gives the photo curable ink composition sets of Examples 5-1 to 5-2, and Comparative Examples 5-1 to 5-2.

Preparation of Ink Compositions A5-1 to 5-2 (see Table 9)

NVF (N-vinyl formamide), allyl glycol, radical polymerization photoinitiators (Irgacure 819 and 127), dispersant (polyoxyalkylene polyalkylene polyamine), and sensitizers were mixed and completely dissolved in the compositions (wt %) shown in Table 9, and the above pigment dispersion (Pigment Black-7) was stirred therein in the form of drops (see Table 9 for amounts). After the conclusion of dropwise addition, the contents were mixed and stirred for 1 hour at ambient temperature, and the products were filtered through 5 µm membrane filters, giving Ink Compositions A5-1 through 5-2.

Preparation of Ink Composition B5-1 to B5-2 (see Table 9)

Allyl glycol, the above Dendrimer 7, and sensitizers were mixed and completely dissolved in the compositions (wt %) shown in Table 9, and the products were filtered through 5 µm membrane filters, giving Ink Compositions B5-1 to B5-2.

Preparation of Ink Compositions A5-1 to 5-4 (see Table 9)

NVF (N-vinyl formamide), allyl glycol, radical polymerization photoinitiators (Irgacure 819 and 127), and sensitizers were mixed and completely dissolved in the compositions (wt %) shown in Table 9, and the products were filtered through 5 µm membrane filters, giving Ink Compositions A5-3 through 5-4.

Preparation of Ink Compositions B5-3 to 5-4 (see Table 9)

Allyl glycol, the above Dendrimer 7, dispersant (polyoxyalkylene polyalkylene polyamine), and sensitizers were mixed and completely dissolved in the compositions (wt %) shown in Table 9, and the above pigment dispersion (Pigment Black-7) was stirred therein in the form of drops (see Table 9 for amounts). After the conclusion of dropwise addition, the contents were mixed and stirred for 1 hour at ambient temperature, and the products were filtered through 5 µm membrane filters, giving Ink Compositions B5-3 to 5-4.

Storage Stability Test, Channel Storage Stability Test, Setting Test

The photo curable ink composition sets of the examples were tested in the same manner as in Example 1-1 by the Storage Stability Test, Channel Storage Stability Test, and Setting Test. The results (evaluation) are given in Table 9.

TABLE 9

|  | Example 5-1 | | Example 5-2 | | Comp. Ex. 5-1 | | Comp. Ex. 5-2 | |
| --- | --- | --- | --- | --- | --- | --- | --- | --- |
|  | Ink comp. A5-1 | Ink comp. B5-1 | Ink comp. A5-2 | Ink comp. B5-2 | Ink comp. A5-3 | Ink comp. B5-3 | Ink comp. A5-4 | Ink comp. B5-4 |
| NVF | 25.0 | — | 25.0 | — | 25.0 | — | 25.0 | — |
| Allyl glycol | 61.0 | 74.0 | 61.7 | 74.7 | 69.0 | 66.0 | 69.7 | 66.7 |
| Dendrimer 7 | — | 25.0 | — | 25.0 | — | 25.0 | — | 25.0 |
| Irgacure 819 | 4.0 | — | 4.0 | — | 4.0 | — | 4.0 | — |
| Irgacure 127 | 1.0 | — | 1.0 | — | 1.0 | — | 1.0 | — |
| Pigment Black 7 | 6.0 | — | 6.0 | — | 6.0 | — | 6.0 | — |
| Dispersant | 2.0 | — | 2.0 | — | — | 2.0 | — | 2.0 |

TABLE 9-continued

|  | Example 5-1 | | Example 5-2 | | Comp. Ex. 5-1 | | Comp. Ex. 5-2 | |
| --- | --- | --- | --- | --- | --- | --- | --- | --- |
|  | Ink comp. A5-1 | Ink comp. B5-1 | Ink comp. A5-2 | Ink comp. B5-2 | Ink comp. A5-3 | Ink comp. B5-3 | Ink comp. A5-4 | Ink comp. B5-4 |
| (polyoxyalkylene polyalkylene polyamine) | | | | | | | | |
| Sensitizer (2,4-diethyl thioxanthone) | 1.0 | 1.0 | — | — | 1.0 | 1.0 | — | — |
| Sensitizer (BzTDAC) | — | — | 0.3 | 0.3 | — | — | 0.3 | 0.3 |
| Storage stability (60(C. (7 days)) | AA | A− | AA | A− | AA | B | AA | B |
| Stability in channel | A | A | A | A | A | B | A | B |
| Setting properties (mJ/cm2) | 6800 | | 7500 | | 13200 | | 15100 | |

Example II

Preparation of Pigment Dispersions 1 through 5

Ethylene glycol monoallyl ether (by Nippon Nyukazai, "AG" below) was added as the monomer to 15 parts C.I. Pigment Black-7 (carbon black) as colorant and 6.0 parts Discol N-509 (by Dainichiseika Color & Chemicals Mfg. Co., Ltd.) as the dispersant, bringing the total to 100 weight parts, and the ingredients were mixed and stirred, giving a mixture.

The mixture underwent a 6-hour dispersion treatment along with zirconia beads (1.5 mm in diameter) using a sand mill (by Yasukawa Seisakusho). The zirconia beads were then separated by a separator, giving a Black Pigment dispersion 1.

Pigment dispersions of the corresponding colors, that is, Yellow Pigment Dispersion 2 (C.I. Pigment Yellow 151), Magenta Pigment Dispersion 3 (C.I. Pigment Violet 19), Cyan Pigment Dispersion 4 (C.I. Pigment Blue 15:3), and White Pigment Dispersion 5 (C.I. Pigment White 6), were prepared in the same manner as above.

Test Example A

Preparation of Ink Compositions A1 through 9 and B1 through 12 for Two-Constituent Photo Curable Ink Sets Monomer (AG), hyperbranched polymer (STAR-501), radical polymerization photoinitiators (Irgacure 819 and 127), polymerization promoter (Darocur EDB), sensitizers (BzTDAC, DETfmC, and ABzC), surfactant (BYK-3570), and polymerization inhibitor (Irgastab UV10) were mixed and completely dissolved in the compositions (wt %) shown in Table 10, and the product was filtered through a 5 μm membrane filter, giving Ink Composition A1.

Ink Compositions A2 through 9 consisting of the compositions in Tables 10 and 11 were obtained by the same method.

TABLE 10

| Ink compositions | A1 | A2 | A3 | A4 | A5 | A6 | A7 |
| --- | --- | --- | --- | --- | --- | --- | --- |
| AG | 73.7 | 73.6 | 73.2 | 72.7 | 73.6 | 73.6 | 73.7 |
| STAR-501 | 17.0 | 17.0 | 17.0 | 17.0 | 17.0 | 17.0 | 17.0 |
| Irgacure 819 | 6.4 | 6.4 | 6.4 | 6.4 | 6.4 | 6.4 | 6.4 |
| Irgacure 127 | 1.6 | 1.6 | 1.6 | 1.6 | 1.6 | 1.6 | 1.6 |
| Darocur EDB | 1.0 | 1.0 | 1.0 | 1.0 | 1.0 | 1.0 | 1.0 |
| BYK-3570 | 0.1 | 0.1 | 0.1 | 0.1 | 0.1 | 0.1 | 0.1 |
| Irgastab UV10 | 0.2 | 0.2 | 0.2 | 0.2 | 0.2 | 0.2 | 0.2 |
| Coumarin compound | BzTDAC 0.01 | BzTDAC 0.1 | BzTDAC 0.5 | BzTDAC 0.1 | DETfmC 0.1 | ABzC 0.1 | — |

3-(2-Benzothiazoyl)-7-diethylamino coumarin: BzTDAC
6,7-Diethoxy-4-(trifluoromethyl)coumarin: DETfmC
7-Acetoxy-3-(2-benzoxazolyl)coumarin: ABzC

TABLE 11

|  | Ink compositions | |
| --- | --- | --- |
|  | A8 | A9 |
| AG | 70.3 | 70.6 |
| Viscoat #1000 | 25.0 | 25.0 |
| Irgacure 819 | 3.2 | 3.2 |
| Irgacure 127 | 0.8 | 0.8 |
| BYK-3500 | 0.2 | 0.2 |
| Irgastab UV10 | 0.2 | 0.2 |
| Coumarin compound | BzTDAC 0.3 | — |

Monomer (Ag), hyperbranched polymer (STAR-501), polymerization promoter (Darocur EDB), sensitizer (BzTDAC), surfactant (BYK-3570), and polymerization inhibitor (Irgastab UV10) were mixed and completely dissolved in the compositions (wt %) shown in Table 3, and the above Pigment Dispersion 1 was stirred therein in the form of drops. After the dropwise addition, the contents were mixed and stirred for 1 hour at ambient temperature, and the product was filtered through a 5 μm membrane filter, giving Ink Composition B1.

Ink Compositions B2 through 12 consisting of the compositions in Tables 12 and 13 were obtained by the same method.

TABLE 12

| Ink compositions | B1 | B2 | B3 | B4 | B5 | B6 |
|---|---|---|---|---|---|---|
| AG | 77.7 | 77.6 | 77.6 | 77.6 | 77.6 | 77.6 |
| STAR-501 | 13.0 | 13.0 | 13.0 | 13.0 | 13.0 | 13.0 |
| Darocur EDB | 1.0 | 1.0 | 1.0 | 1.0 | 1.0 | 1.0 |
| BYK-3570 | 0.1 | 0.1 | 0.1 | 0.1 | 0.1 | 0.1 |
| Irgastab UV10 | 0.2 | 0.2 | 0.2 | 0.2 | 0.2 | 0.2 |
| Pigments | C. I. PBk7 6.0 | C. I. PBk7 6.0 | C. I. PY151 6.0 | C. I. PV19 6.0 | C. I. PB15:3 6.0 | C. I. PW6 6.0 |
| Dispersion resin | 2.0 | 2.0 | 2.0 | 2.0 | 2.0 | 2.0 |
| Coumarin compound | — | BzTDAC 0.1 | BzTDAC 0.1 | BzTDAC 0.1 | BzTDAC 0.1 | BzTDAC 0.1 |

TABLE 13

| Ink compositions | B7 | B8 | B9 | B10 | B11 | B12 |
|---|---|---|---|---|---|---|
| AG | 71.6 | 71.3 | 71.3 | 71.3 | 71.3 | 71.3 |
| Viscoat #10 | 20.0 | 20.0 | 20.0 | 20.0 | 20.0 | 20.0 |
| BYK-3500 | 0.2 | 0.2 | 0.2 | 0.2 | 0.2 | 0.2 |
| Irgastab UV10 | 0.2 | 0.2 | 0.2 | 0.2 | 0.2 | 0.2 |
| Pigments | C. I. PBk7 6.0 | C. I. PBk7 6.0 | C. I. PY213 6.0 | C. I. PV19 6.0 | C. I. PB15:3 6.0 | C. I. PW6 6.0 |
| Dispersion resin | 2.0 | 2.0 | 2.0 | 2.0 | 2.0 | 2.0 |
| Coumarin compound | — | BzTDAC 0.3 | BzTDAC 0.3 | BzTDAC 0.3 | BzTDAC 0.3 | BzTDAC 0.3 |

Setting Test 1

When the ink compositions A and ink compositions B prepared above were mixed, the setting properties were assessed using a Physica MCR-301 rheometer (with a UV setting properties measurement option) by Anton Paar Co.

Specifically, the setting properties were assessed by measuring the UV dose (mW/cm$^2$) of the UV ray source beforehand, initiating photopolymerization by UV ray irradiation, measuring the time (sec) until the increase in the elastic modulus became constant as the curing reaction progressed, and determining the energy (mJ/cm$^2$) needed for curing from the UV dose (mW/cm$^2$)×time (sec).

Tables 14 and 15 give the energy (mJ/cm$^2$) needed for setting when the ink compositions A and B were mixed.

TABLE 14

| Setting Test 1 | Example 1 | Example 2 | Example 3 | Example 4 | Example 5 | Example 6 | Example 7 | Example 8 | Comp. Ex. 1 |
|---|---|---|---|---|---|---|---|---|---|
| Ink comp. A | A1 | A2 | A3 | A4 | A5 | A6 | A2 | A7 | A7 |
| Ink comp. B | B1 | B1 | B1 | B1 | B1 | B1 | B2 | B2 | B1 |
| Energy needed when Ink comp. A and B mixed (mJ/cm$^2$) | 14700 | 14200 | 14200 | 14800 | 14200 | 14800 | 13600 | 14800 | 15500 |

TABLE 15

| | Example 10 | Example 11 | Comp. Ex. 2 |
|---|---|---|---|
| Ink comp. A | A8 | A8 | A9 |
| Ink comp. B | B7 | B8 | B7 |

TABLE 15-continued

| | Example 10 | Example 11 | Comp. Ex. 2 |
|---|---|---|---|
| Energy needed when Ink comp. A and B mixed (mJ/cm$^2$) | 14000 | 12600 | 16000 |

Setting Test 2

The color ink sets (Examples 9 and 12) consisting of the ink compositions in Table 16 were used in a Seiko Epson Inkjet Printer PM-G920 to print full color images under conditions where the ink compositions B2 and B8 were used for the photo black row, the ink compositions B3 through B5 and B9 through B11 were used for the corresponding color rows, the ink compositions A1 and A8 were used for the gloss optimizer row, the ink compositions B6 and B12 were used for the matte black row, and the various color inks were used at the corresponding positions, while the ink compositions A1 and A8 covered the entire image area, at ambient temperature and pressure.

The recording medium was A4 size OHP film (Xerox Film <unframed>, by Fuji Xerox).

Printing and setting treatments were carried out under setting conditions where the cumulative amount of light by the UV source positioned at the paper discharge outlet was 600 mJ/cm$^2$, and it was confirmed that full color images with a cured film coating had been obtained.

TABLE 16

| Setting Test 2 | Example 9 | Example 12 |
|---|---|---|
| Ink comp. A | A1 | A8 |
| Ink comp. B | B2 | B8 |
| | B3 | B9 |
| | B4 | B10 |
| | B5 | B11 |
| | B6 | B12 |
| Energy needed when Ink comp. A and B mixed (mJ/cm$^2$) | 13800 | 12600 |

It was also found that a backing process can be carried out before image formation using ink compositions A1 and A8 and ink compositions B6 and B12 (white ink) in addition to the above so that the backs of transparent recording media such as the above can be made opaque, and that a backing process can also be carried out over the image after the image has been formed on transparent recording media to enable printing that is opaque in the back.

Example B

Preparation of Ink Compositions A1 through 8 and B1 through 12 for Two-Constituent Photo Curable Ink Monomer (AG), hyperbranched polymer (STAR-501), radical polymerization photoinitiators (Irgacure 819 and 127), polymerization promoter (Darocur EDB), sensitizers (DETX, ITX), surfactant (BYK-3570), and polymerization inhibitor (Irgastab UV10) were mixed and completely dissolved in the compositions (wt %) shown in Table 8, and the product was filtered through a 5 μm membrane filter, giving Ink Composition A1.

Ink compositions A2 through 8 consisting of the compositions in Tables 17 and 18 were obtained in the same manner.

TABLE 17

| Ink compositions | A1 | A2 | A3 | A4 | A5 | A6 |
|---|---|---|---|---|---|---|
| AG | 73.6 | 73.6 | 73.2 | 72.7 | 73.6 | 73.7 |
| STAR-501 | 17.0 | 17.0 | 17.0 | 17.0 | 17.0 | 17.0 |
| Irgacure 819 | 6.4 | 6.4 | 6.4 | 6.4 | 6.4 | 6.4 |
| Irgacure 127 | 1.6 | 1.6 | 1.6 | 1.6 | 1.6 | 1.6 |
| Darocur EDB | 1.0 | 1.0 | 1.0 | 1.0 | 1.0 | 1.0 |
| BYK-3570 | 0.1 | 0.1 | 0.1 | 0.1 | 0.1 | 0.1 |
| Irgastab UV10 | 0.2 | 0.2 | 0.2 | 0.2 | 0.2 | 0.2 |
| Thioxanthone compounds | DETX 0.1 | DETX 0.5 | DETX 1.0 | DETX 2.0 | DETX 1.0 | — |

Isopropyl thioxanthone: ITX
2,4-diethyl thioxanthone: DETX

TABLE 18

| | Ink compositions | |
|---|---|---|
| | A7 | A8 |
| AG | 69.6 | 70.6 |
| Viscoat #1000 | 25.0 | 25.0 |
| Irgacure 819 | 3.2 | 3.2 |
| Irgacure 127 | 0.8 | 0.8 |
| BYK-3500 | 0.2 | 0.2 |
| Irgastab UV10 | 0.2 | 0.2 |
| Thioxanthone compounds | DETX 1.0 | — |

Monomer (AG), hyperbranched polymer (STAR-501), polymerization promoter (Darocur EDB), sensitizer (DETX), surfactant (BYK-3570), and polymerization inhibitor (Irgastab UV10) were mixed and completely dissolved in the compositions (wt %) shown in Table 19, and the above Pigment Dispersion 1 was stirred therein in the form of drops. After the dropwise addition, the contents were mixed and stirred for 1 hour at ambient temperature, and the product was filtered through a 5 μm membrane filter, giving Ink Composition B1.

Ink compositions B2 through 12 consisting of the compositions in Tables 19 and 20 were obtained in the same manner.

TABLE 19

| Ink compositions | B1 | B2 | B3 | B4 | B5 | B6 |
|---|---|---|---|---|---|---|
| AG | 77.7 | 76.7 | 76.7 | 76.7 | 76.7 | 76.7 |
| STAR-501 | 13.0 | 13.0 | 13.0 | 13.0 | 13.0 | 13.0 |
| Darocur EDB | 1.0 | 1.0 | 1.0 | 1.0 | 1.0 | 1.0 |
| BYK-3570 | 0.1 | 0.1 | 0.1 | 0.1 | 0.1 | 0.1 |
| Irgastab UV10 | 0.2 | 0.2 | 0.2 | 0.2 | 0.2 | 0.2 |
| Pigments | C. I. PBk7 6.0 | C. I. PBk7 6.0 | C. I. PY151 6.0 | C. I. PV19 6.0 | C. I. PB15:3 6.0 | C. I. PW6 6.0 |
| Dispersion resin | 2.0 | 2.0 | 2.0 | 2.0 | 2.0 | 2.0 |
| Thioxanthone compound | — | DETX 1.0 | DETX 1.0 | DETX 1.0 | DETX 1.0 | DETX 1.0 |

TABLE 20

| Ink compositions | B7 | B8 | B9 | B10 | B11 | B12 |
|---|---|---|---|---|---|---|
| AG | 71.6 | 70.6 | 70.6 | 70.6 | 70.6 | 70.6 |
| Viscoat #1000 | 20.0 | 20.0 | 20.0 | 20.0 | 20.0 | 20.0 |
| BYK-3500 | 0.2 | 0.2 | 0.2 | 0.2 | 0.2 | 0.2 |
| Irgastab UV10 | 0.2 | 0.2 | 0.2 | 0.2 | 0.2 | 0.2 |
| Pigments | C. I. PBk7 6.0 | C. I. PBk7 6.0 | C. I. PY213 6.0 | C. I. PV19 6.0 | C. I. PB15:3 6.0 | C. I. PW6 6.0 |
| Dispersion resin | 2.0 | 2.0 | 2.0 | 2.0 | 2.0 | 2.0 |
| Thioxanthone compound | — | DETX 1.0 | DETX 1.0 | DETX 1.0 | DETX 1.0 | DETX 1.0 |

Setting Test 1

When the ink compositions A and ink compositions B prepared above were mixed, the setting properties were assessed in the same manner as Example A. The results are given in Tables 21 and 22.

TABLE 21

| Setting Test 1 | Example 1 | Example 2 | Example 3 | Example 4 | Example 5 | Example 6 | Example 7 | Comp. Ex. 1 |
|---|---|---|---|---|---|---|---|---|
| Ink comp. A | A1 | A2 | A3 A4 | A5 | A3 | A5 | A6 | |
| Ink comp. B | B1 | B1 | B1 | B1 | B1 | B2 | B2 | B1 |
| Energy needed when Ink comp. A and B mixed (mJ/cm$^2$) | 14200 | 13000 | 10400 | 11600 | 9000 | 10000 | 9000 | 15500 |

TABLE 22

| | Example 10 | Example 11 | Comp. Ex. 2 |
|---|---|---|---|
| Ink comp. A | A7 | A7 | A8 |
| Ink comp. B | B7 | B8 | B7 |
| Energy needed when Ink comp. A and B mixed (mJ/cm$^2$) | 8400 | 7200 | 15000 |

Setting Test 2

A printing and setting process were carried out in the same manner as Example A using color ink sets consisting of the ink compositions in Table 23 (Examples 8 and 12), and it was determined that full color images with a cured film coating had been obtained.

TABLE 23

| Setting Test 2 | Example 8 | Example 12 |
|---|---|---|
| Ink comp. A | A1 | A7 |
| Ink comp. B | B2 | B8 |
| | B3 | B9 |
| | B4 | B10 |
| | B5 | B11 |
| | B6 | B12 |
| Energy needed when Ink comp. A and B mixed (mJ/cm$^2$) | 10000 | 7200 |

It was also found that a backing process can be carried out before image formation using ink compositions A1 and A7 and ink compositions B6 and B12 (white ink) in addition to the above so that the backs of transparent recording media such as the above can be made opaque, and that a backing process can also be carried out over the image after the image has been formed on transparent recording media to enable printing that is opaque in the back.

As shown above, the ink sets of the examples of the invention had better photo curing sensitivity.

What is claimed is:

1. A photo curable ink composition set, comprising:
    an ink composition A that includes at least a color material, a polymerizable compound comprising at least an allyl compound, and a radical polymerization photoinitiator; and
    an ink composition B that includes at least a radical polymerizable compound and does not include any color material or radical polymerization photoinitiator, wherein
    the ink composition A and/or B includes a sensitizer.

2. The photo curable ink composition set according to claim 1, comprising, as the radical polymerizable compound included in the ink composition B, at least a radical polymerizable compound that is copolymerized with the polymerizable compound included in the ink composition A in the presence of radicals when the ink composition A and the ink composition B are mixed.

3. The photo curable ink composition set according to claim 2, wherein the radical polymerizable compound that is included in the ink composition B and is copolymerized with the polymerizable compound included in the ink composition A in the presence of radicals when the ink composition A and the ink composition B are mixed is a dendritic polymer.

4. The photo curable ink composition set according to claim 3, wherein the dendritic polymer is a hyperbranched polymer and/or dendrimer.

5. The photo curable ink composition set according to claim 1, wherein the sensitizer is one or a mixture of two or more thioxanthone compounds or coumarin compounds.

6. The photo curable ink composition set according to claim 1, wherein the allyl compound is an allyl ether compound.

7. The photo curable ink composition set according to claim 6, wherein the allyl ether compound is allyl glycol.

8. A recording method employing the photo curable ink composition according to claim 1.

9. A recording obtained by the recording method according to claim 8.

10. A recording method comprising providing the photo curable ink composition set according to claim 1, mixing the ink composition A and the ink composition B, and then discharging onto a recording medium and photosetting by irradiation with light.

11. A recording method comprising providing the photo curable ink set according to claim 1, individually discharging the ink composition A and the ink composition B such that they are mixed on a recording medium, and photosetting by irradiation with light.

12. A photo curable ink composition set, comprising:
a first ink composition that includes a radical polymerization photoinitator and a polymerizable compound; and
a second ink composition that includes a color material and a polymerizable compound, wherein
the first ink composition and/or the second ink composition includes a sensitizer selected from the group consisting of a thioxanthone compound and a coumarin compound, and wherein each of the first ink composition and the second ink composition includes an ethylene glycol monoallyl ether and/or N-vinyl compound as the polymerizable compound,
the first ink composition and the second ink composition being photosettable when mixed together and irradiated with light.

13. The photo curable ink composition set according to claim 12, wherein the first ink composition and the second ink composition are both composed of nonvolatile components.

14. The photo curable ink composition set according to claim 12, wherein a concentration of the sensitizer is 0.01 wt % to 1.0 wt % in the first ink composition and/or the second ink composition.

15. The photo curable ink composition set according to claim 12, wherein the N-vinyl compound is N-vinyl formamide.

16. The photo curable ink composition set according to claim 12, wherein the first ink composition and the second ink composition include at least one dendritic polymer as the polymerizable compound.

17. The photo curable ink composition set according to claim 16, wherein the dendritic polymer is a hyperbranched polymer and/or dendrimer.

18. A recording method comprising providing the photo curable ink composition set according to claim 12, mixing the first ink composition and the second ink composition, and then discharging onto a recording medium and photosetting by irradiation with light.

19. A recording method comprising providing the photo curable ink set according to claim 12, individually discharging the first ink composition and the second ink composition such that they are mixed on a recording medium and photosetting by irradiation with light.

* * * * *